United States Patent
Groth et al.

(10) Patent No.: US 10,501,834 B2
(45) Date of Patent: Dec. 10, 2019

(54) METHOD FOR REDUCING THE SPEED OF PROPAGATION OF A CRACK IN A METAL SUBSTRATE

(71) Applicant: Helmholtz-Zentrum Geesthacht Zentrum für Material- und Küstenforschung GmbH, Geesthacht (DE)

(72) Inventors: Anne Groth, Geesthacht (DE); Nikolai Kashaev, Hittenbergen (DE); Norbert Huber, Adendorf (DE)

(73) Assignee: Helmholtz-Zentrum Geesthacth Zentrum für Material-und Küstenforschung GmbH, Geestacht (DE)

( * ) Notice: Subject to any disclaimer, the term of this patent is extended or adjusted under 35 U.S.C. 154(b) by 756 days.

(21) Appl. No.: 15/153,091

(22) Filed: May 12, 2016

(65) Prior Publication Data
US 2016/0348223 A1 Dec. 1, 2016

(30) Foreign Application Priority Data
Jun. 1, 2015 (EP) .................................... 15170102

(51) Int. Cl.
*C21D 1/00* (2006.01)
*C22F 1/04* (2006.01)
(Continued)

(52) U.S. Cl.
CPC .............. *C22F 1/04* (2013.01); *B23K 26/035* (2015.10); *C22F 3/00* (2013.01)

(58) Field of Classification Search
CPC .......... C22F 1/04; C22F 3/00; B23K 26/0006; B23K 26/352; B23K 26/035;
(Continued)

(56) References Cited

U.S. PATENT DOCUMENTS

| 5,071,492 A | 12/1991 | Parker et al. |
| 2005/0039828 A1 | 2/2005 | Nolan |
| 2011/0290770 A1* | 12/2011 | Steinwandel .......... C21D 10/00 219/121.85 |

FOREIGN PATENT DOCUMENTS

| EP | 1752547 A1 | 2/2007 |
| EP | 2561946 A1 | 2/2013 |

OTHER PUBLICATIONS

Liao et al. "Controlled precipitation by thermal engineered laser shock peening and its effect on dislocation pinning: Multiscale dislocation dynamics simulation and experiments" Jan. 16, 2013, Acta Materialia 61 (2013) 1957-1967 (Year: 2103).*
(Continued)

*Primary Examiner* — Haytham Soliman
(74) *Attorney, Agent, or Firm* — Marshall, Gerstein & Borun LLP

(57) ABSTRACT

A method for reducing the speed of propagation of a crack in a metal substrate by means of laser heat treatment can include heating the metal substrate with a laser heat treatment at one or more crack ends, wherein the laser beam is guided over the substrate surface so that it defines the form of an oval, an arc or a curve. Alternatively, the substrate can be treated by means of laser heat treatment before a crack arises. For example, areas at risk of cracking are identified in a metal substrate and the metal substrate is then heated by means of laser heat treatment in these areas, wherein the laser beam is guided over the substrate surface so that it defines the form of an oval, an arc or a curve. Also disclosed herein are metal substrates produced by the method and the use thereof.

15 Claims, 2 Drawing Sheets

(51) Int. Cl.
*B23K 26/035* (2014.01)
*C22F 3/00* (2006.01)

(58) Field of Classification Search
CPC .......... B23K 2103/10; B23K 2101/006; B23K 2103/04; B23K 2103/15; B23K 2103/14; B23P 6/04; C21D 1/09; C21D 2221/00
USPC .......................................................... 148/565
See application file for complete search history.

(56) References Cited

OTHER PUBLICATIONS

Clauer et al. "The Effects of Laser Shock Processing on the Fatigue Properties of 2024-T3 Aluminum" 1983 ASM Conference on Applications of Lasers in Materials Processing, Reprinted from Lasers in Materials Processing, 1983, ASM, Metals Park, Ohio, pp. 7-22. (Year: 1983).*

European Search Report in related European Application No. 15170102.6 dated Nov. 4, 2015.

Dalong Cong et al. The thermal fatigue resistance of H13 steel repaired by a biomimetic laser remelting process Original Research Article *Materials & Design*, vol. 55, Mar. 2014, pp. 597-604.

D. Schnubel et al. Retardation of fatigue crack growth in aircraft aluminium alloys via laser heating—Experimental proof of concept *Materials Science and Engineering: A*, vol. 546, Jun. 1, 2012, pp. 8-14.

Gujba et al., Laser Peening Process and Its Impact on Materials Properties in Comparison with Shot Peening and Ultrasonic Impact Peening, Materials 2014, pp. 7925-7974, Dec. 10, 2014.

Fraunhofer Institute for Laser Technology ILT, Heat Treatment Using Laser Radiation, Nov. 2009.

* cited by examiner

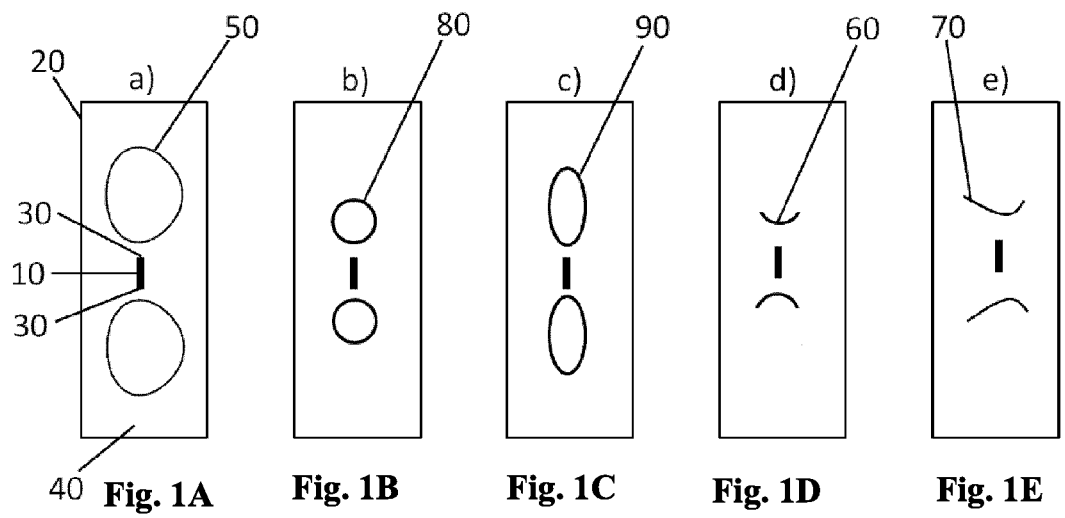
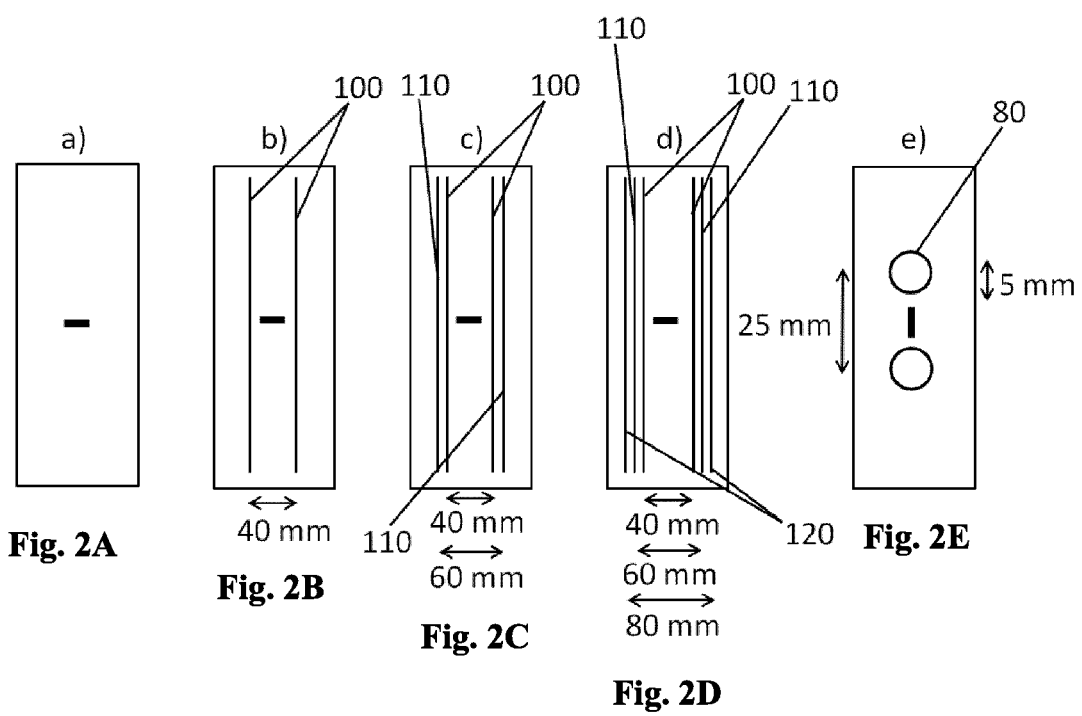

METHOD FOR REDUCING THE SPEED OF PROPAGATION OF A CRACK IN A METAL SUBSTRATE

CROSS REFERENCE TO RELATED APPLICATION

The benefit of priority to European Patent Application No. 15170102.6 filed Jun. 1, 2015, is hereby claimed and the disclosure is incorporated herein by reference.

FIELD OF THE DISCLOSURE

The present invention relates to a method for reducing the speed of propagation of a crack in a metal substrate.

BACKGROUND OF THE INVENTION

One of the future challenges for the aviation industry is to develop suitable strategies for the maintenance and extension of service life of the existing aircraft fleet. A particular problem is the formation of cracks, in particular fatigue cracks, and the growth thereof in different aircraft components. Cracks usually indicate imminent failure of the components affected, meaning that relevant components must be regularly checked, maintained and possibly even exchanged. Different approaches have already been developed in the past in order to reduce the growth of fatigue cracks in different aircraft components, such as for example the lower aircraft body, and thus to extend the service life of the components. Methods are particularly advantageous which can be used preventatively already before the formation of cracks, in order to reduce crack formation or, ideally, to prevent it. At the present time, so-called crack stoppers or crack delaying elements are usually used that are made for example from titanium or CFRP and are intended to reduce the growth of cracks. Since these methods usually involve the application of additional materials to the aircraft components, these methods generally lead to an increased weight of the respective component. Furthermore, welding of the joints between the aircraft skin and the crack stopper often requires great resources. All in all, the process thus requires very great resources and is expensive.

There is thus a great interest in developing cost-effective methods that are easy to carry out in order to reduce the speed of propagation of cracks, in particular fatigue cracks. Furthermore there is an interest in developing cost-effective methods that are easy to carry out, with which the substrate surface can be preventatively treated already before a crack arises, in order to already reduce the formation of a fatigue crack or, ideally, to completely prevent it. In this connection, residual stress-based methods represent a very promising approach. A particularly advantageous method for increasing the service life of the most varied components is the so-called laser heat treatment method. In this method, joints and residual stresses in a metal substrate are locally influenced close to the surface, whereby the speed of propagation of a crack is reduced. In this way, the service life of the metal substrate can be clearly increased without additional materials being welded or riveted. The original component, thus the metal substrate, is merely modified, whereby weight and costs can be saved.

Laser heat treatment methods have already been used to reduce the speed of propagation of cracks. U.S. Pat. No. 5,071,492 describes, for example, a method, wherein the substrate surface is heated parallel to the cracks arising, wherein a laser, inter alia, can also be used.

D. Schnubel et al. describe in "Materials Science and Technology A 546 (2012) 8-14" the use of a defocused laser to influence residual stresses in order to reduce the speed of propagation of fatigue cracks. The laser beam is thereby guided linearly over the substrate surface.

In the already known methods the laser beam is guided in points or lines over the substrate surface.

Within the scope of this invention it was unexpectedly shown that the effect of the residual stresses produced by means of laser heat treatment is significantly greater if the laser beam is not guided in the form of a line or a point, but instead in the form of a circle, an arc or a curve, over the material surface. It was found that the method according to the invention achieves significantly longer service lives of the treated materials at the same time as achieving low process and cost resources. Without wishing to be bound by a certain theory, it is assumed that this unexpected effect lies in the positive superimposition of the residual stress fields.

BRIEF DESCRIPTION OF THE DRAWINGS

FIGS. 1A-1E are schematic illustrations of a method in accordance with various embodiments of the disclosure;

FIGS. 2A-2E show schematically the substrates used in the example;

DESCRIPTION OF THE INVENTION

Figure 3:
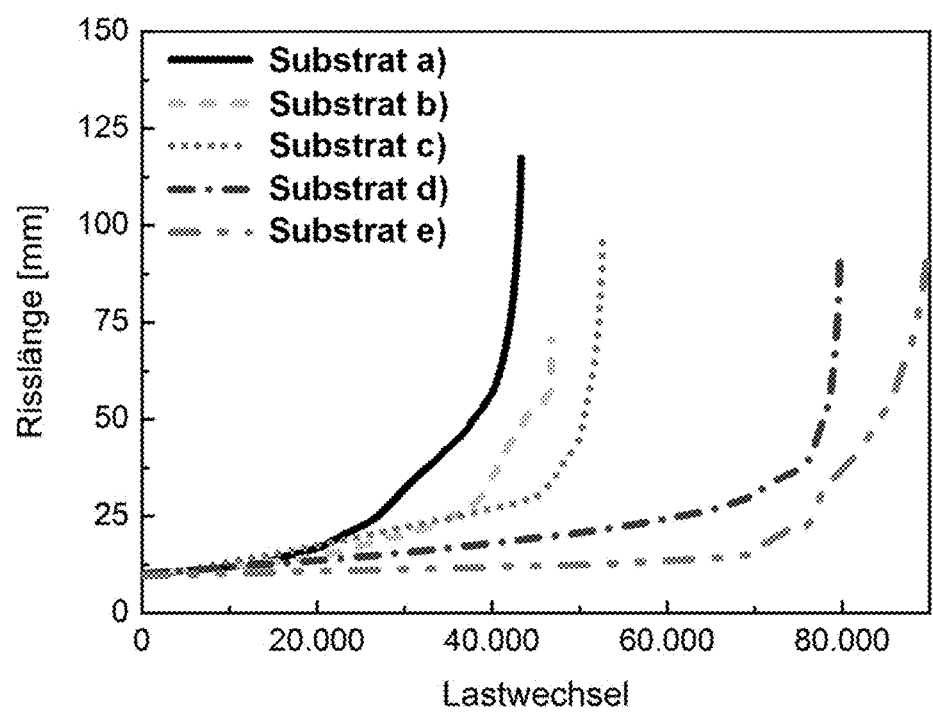
FIG. 3 shows the development of the length of the crack as a function of the number of load changes applied and the geometric form which the laser beam defines during guiding over the substrate surface.

It is the object of the present invention to provide a method, with which the service life of a metal substrate can be extended even further in comparison with already known methods. In particular a method is to be provided, with which the propagation rate of fatigue cracks is reduced even further in comparison with already known methods. Furthermore a metal substrate is to be provided that has a reduced fatigue crack propagation rate.

The objects according to the invention are achieved by a method according to claims 1 and 2 and by a substrate according to claim 12.

With the method according to the invention, load change increases of more than 100% can be achieved in comparison with the untreated base substrate.

Accordingly a method is provided, through which the speed of propagation of a crack in a metal substrate can be reduced. For this, a crack in a metal substrate is initially identified, wherein the crack has two or more crack ends. Then, the metal substrate is heated by means of laser heat treatment at one or more ends of the crack in the propagation directions of the crack. The laser beam is thereby guided over the substrate surface so that it defines the form of an oval, an arc or a curve.

Alternatively, the metal substrate can be treated by means of laser heat treatment to prevent the formation and propagation of a crack already before it arises. For this, first of all, areas in a metal substrate that are at risk of cracking are identified and the metal substrate is then heated in expected crack propagation directions by means of laser heat treatment in the areas at risk of cracking, before the crack occurs. Also in this case the laser beam is guided over the substrate surface so that it defines the form of an oval, an arc or a curve.

According to one embodiment, initially one or more cracks 10 are identified in the metal substrate 20, of which the service life is to be extended. The one or more cracks 10 usually have two crack ends 30. It is also conceivable, however, for the crack 10 to have more than two crack ends 30. Subsequently, the metal substrate 20 is heated by means of laser heat treatment at one or more crack ends 30 of the previously identified crack 10. The laser beam is thereby guided over the substrate surface 40 so that it defines the form of an oval 50, an arc 60 or a curve 70 (see FIG. 1). An oval, arc-form or curve-form structure is thus incorporated into the metal substrate by means of laser heat treatment at one or more crack ends 30. The term "oval" 50 is to be understood within the scope of this invention in that circles 80 and ellipses 90 are included therein as special cases.

The distance between the crack end 30 and the structure incorporated into the substrate 20 by means of laser heat treatment will be selected by the person skilled in the art based on his general specialist knowledge. If the structure incorporated into the substrate 20 is a circle, the distance between the crack end 30 and the circle mid-point is preferably 5 to 15 mm, more preferably 8 to 12 mm, most preferably approximately 10 mm.

According to another embodiment of the method according to the invention the metal substrate 20 is already treated by means of laser heat treatment before the formation of a crack 10. For this, firstly, areas at risk of cracking are identified in the metal substrate 20 and the metal substrate 20 is then heated in expected crack propagation directions by means of laser heat treatment in the areas at risk of cracking, before a crack 10 arises. In this embodiment the laser beam is also guided over the substrate surface 40 so that it defines the form of an oval 50, an arc 60 or a curve 70. Also in this case, an oval, arc-form or curve-form structure is incorporated into the metal substrate 20 by means of laser heat treatment.

According to one embodiment the laser beam is guided over the substrate surface 40 so that it defines the form of an oval 50 (FIG. 1). It preferably defines the form of a circle 80 (FIG. 1) or an ellipsis 90 (FIG. 1), more preferably a circle 80 (FIG. 1). The circles 80 preferably have a diameter of 3-7 mm, more preferably 4-6 mm, even more preferably approximately 5 mm. The circles 80 preferably have a mid-point distance of 20-30 mm, more preferably approximately 25 mm, with respect to each other. However, other circle diameters and mid-point distances are also conceivable which the person skilled in the art may freely select corresponding to the crack 10 in question.

The parameters of the laser heat treatment will be selected by the person skilled in the art based on his specialist knowledge so that the metal substrate 20 is not too greatly impaired. The metal substrate 20 is preferably heated to a temperature below the melt temperature. When using an aluminium substrate the substrate is preferably heated to a temperature of between 300 and 800° C., more preferably between 400 and 700° C., even more preferably to approximately 600° C. For example, a defocused laser with a spot diameter of approximately 3.5 mm on the substrate surface, a power of 600 W and a laser speed of 1600 mm/min can be used.

According to an embodiment illustrated in the figures the crack 10 has two crack ends 30 and the substrate 20 is heated by means of laser heat treatment at both crack ends 30 in the propagation directions of the crack 10. According to another embodiment the crack 10 has two crack ends 30 and the substrate 20 is heated by means of laser heat treatment only at one crack end 30 in the propagation direction of the crack 10, wherein the substrate 20 remains untreated at the other crack end 30. According to another embodiment the crack 10 has more than two crack ends 30 and the substrate 20 is heated by means of laser heat treatment at all crack ends 30. It is, however, also conceivable for the substrate to be heated by means of laser heat treatment at one or more crack ends 30, but not at all crack ends 30. The geometric structure defined by the laser beam as it is guided over the substrate surface 40 can be freely selected at each crack end 30, at which the laser beam is guided over the substrate surface 40. It is thus conceivable for example that the laser beam is guided at one crack end 30 of a crack 10 over the substrate surface 40 so that it defines the form of a circle 80 and is guided at another crack end 30 of the same crack 10 over the substrate surface 40 so that it defines the form of a curve 70. The geometric structures can thereby be selected and combined independently of each other.

The metal substrate 20 can for example comprise or consist of aluminium, steel, titanium or magnesium. According to a preferred embodiment the metal substrate 20 is an aluminium alloy.

The present invention further relates to a metal substrate 10 produced by the method according to the invention.

The metal substrate 20 produced by the method according to the invention is preferably used as a component in a land or water vessel or aircraft. The metal substrate 20 is particularly preferably used as a component in the lower aircraft body of an aircraft.

EXAMPLE

The invention will now be explained in more detail by reference to the following examples, wherein the examples do not in any way limit the invention to this embodiment.

The development of the length of the crack in a metal substrate 20 as a function of the load changes applied and the geometric form, in which the laser beam is guided over the substrate surface 40 during the laser heat treatment, was examined. The trials were carried out on M(T)200 test pieces of AA2024T3 with a thickness of 2 mm. A laser power of 600 W, a laser speed of 1600 mm/min and a defocused laser with a spot diameter of 3.5 mm on the test piece surface were used. Firstly, a crack of 7 mm was incorporated (eroded) into the middle of the test piece. Then the substrate 20 was exposed to a continuous number of load changes and the crack length was determined as a function of the number of load changes. The following test pieces were examined: comparison substrate a) untreated substrate (see FIG. 2a); substrate b) two lines 100 applied by means of laser heat treatment in the propagation direction of the crack 10 at a distance of 40 mm relative to each other (one line for each side of the crack (see FIG. 2b), not according to the invention); substrate c) two lines 100 applied by means of laser heat treatment in the propagation direction of the crack 10 at a distance of 40 mm relative to each other and two lines 110, extending parallel thereto, applied by means of laser heat treatment, at a distance of 60 mm relative to each other (two lines per crack side (see FIG. 2c), not according to the invention); substrate d) two lines 100 applied by means of laser heat treatment in the propagation direction of the crack 10 at a distance of 40 mm relative to each other, two lines 110, extending parallel thereto, applied by means of laser heat treatment at a distance of 60 mm relative to each other, as well as two lines 120, extending parallel thereto, applied by means of laser heat treatment at a distance of 80 mm relative to each other (three lines per crack side (see FIG. 2d), not according to the invention); substrate e) two circles 80 applied by means of laser heat treatment in the propagation direction of the crack 10, each having a diameter of 5 mm and a mid-point distance of 25 mm (see FIG. 2e), according to the invention).

The results are shown in FIG. 3. It can be seen that load change increases of more than 100% in comparison with the base material can be reached by the method according to the invention. While comparison substrate a) already shows a spasmodic increase in the crack length at approximately 40,000 load changes, this is the case with the substrate e) according to the invention only at 80,000 load changes, wherein the crack growth even at this high number of load changes advances significantly more slowly than in the case of comparison substrate a) after 40,000 load changes. Substrate b) shows a slightly increased service life in comparison with comparison substrate a), whereby this service life can be further increased by the application of additional lines (see substrates c) and d)). Surprisingly, the substrate e) according to the invention with only one circle per crack side shows a significantly increased service life in comparison with substrate d), wherein three lines per crack side were applied to the substrate by means of laser heat treatment.

For a better overview, the number of load changes with a crack length of 65 mm is summarised in Table 1 for the different substrates:

TABLE 1

Load changes with a crack length of 65 mm.

|  | Load changes with a crack length of 65 mm |
| --- | --- |
| Comparison substrate a) (not according to the invention) | 41,200 |
| Substrate b) (not according to the invention) | 46,700 |
| Substrate c) (not according to the invention) | 51,700 |
| Substrate d) (not according to the invention) | 79,000 |
| Substrate e) (according to the invention) | 87,100 |

The invention claimed is:

1. A method for reducing the speed of propagation of a crack in a metal substrate, comprising:
  (a) identifying a crack in the metal substrate, wherein the crack has two or more crack ends; and
  (b) heating the metal substrate using a laser heat treatment by guiding a laser beam over a surface of the metal substrate, at one or more crack ends, to thereby heat the surface in the propagation directions of the crack,
  wherein the laser beam is guided over the surface of the metal substrate in a path having a shape of an oval, an arc, or a curve, and the metal surface is heated to a temperature of about 300° C. to a temperature below the melt temperature of the metal substrate.

2. A method for reducing the speed of propagation of a crack in a metal substrate, comprising:
  (a) identifying areas at risk of cracking in a metal substrate; and
  (b) heating the metal substrate using a laser heat treatment by guiding a laser beam over a surface of the metal substrate, in the identified areas at risk of cracking, before a crack arises, to thereby heat the surface in expected crack propagation directions,
  wherein the laser beam is guided over the surface of the metal substrate in a path having a shape of an oval, an arc, or a curve, and the metal surface is heated to a temperature of about 300° C. to a temperature below the melt temperature of the metal substrate.

3. The method according to claim 1, wherein the path has the shape of an oval.

4. The method according to claim 3, wherein the oval is a circle or an ellipsis.

5. The method according to claim 1, wherein the crack has two crack ends and the the laser beam is guided over the surface of the metal substrate at both crack ends to thereby heat the surface in the propagation direction of the crack.

6. The method according to claim 5, wherein the laser beam is guided in a path at both crack ends that has the shape of a circle to form circles at each crack end.

7. The method according to claim 6, wherein the circles each has a diameter of 3 mm to 7 mm, and a mid-point distance between the circles is 20 mm to 30 mm.

8. The method according to claim 1, wherein the metal substrate is an aluminium alloy.

9. The method according to claim 8, wherein the metal substrate is heated to a temperature between 300° C. and 800° C.

10. The method of claim 4, wherein the oval is a circle.

11. The method of claim 7, wherein the circles each have a diameter of 4 mm to 6 mm.

12. The method of claim 7, wherein the circles each has a diameter of approximately 5 mm.

13. The method of claim 7, wherein the mid-point distance is approximately 25 mm.

14. The method of claim 9, wherein the metal substrate is heated to a temperature between 400° C. and 700° C.

15. The method of claim 9, wherein the metal substrate is heated to approximately 600° C.

* * * * *